(12) United States Patent
Fattal

(10) Patent No.: US 10,788,619 B2
(45) Date of Patent: Sep. 29, 2020

(54) DUAL LIGHT GUIDE GRATING-BASED BACKLIGHT AND ELECTRONIC DISPLAY USING SAME

(71) Applicant: LEIA INC., Menlo Park, CA (US)

(72) Inventor: David A. Fattal, Mountain View, CA (US)

(73) Assignee: LEIA INC., Menlo Park, CA (US)

(*) Notice: Subject to any disclaimer, the term of this patent is extended or adjusted under 35 U.S.C. 154(b) by 342 days.

(21) Appl. No.: 15/724,209

(22) Filed: Oct. 3, 2017

(65) Prior Publication Data

US 2018/0024289 A1 Jan. 25, 2018

Related U.S. Application Data

(63) Continuation of application No. PCT/US2015/027399, filed on Apr. 23, 2015.

(51) Int. Cl.
*G02B 5/18* (2006.01)
*F21V 8/00* (2006.01)

(52) U.S. Cl.
CPC ......... *G02B 6/0076* (2013.01); *G02B 6/0028* (2013.01); *G02B 6/0031* (2013.01);
(Continued)

(58) Field of Classification Search
CPC .. G02B 6/0076; G02B 6/0078; G02B 6/0036; G02B 6/0068; G02B 6/0028;
(Continued)

(56) References Cited

U.S. PATENT DOCUMENTS 5,615,024 A 3/1997 May et al.
5,617,248 A 4/1997 Takahashi et al.
(Continued)

FOREIGN PATENT DOCUMENTS

CN 1213097 A 4/1999
CN 1619373 A 5/2005
(Continued)

OTHER PUBLICATIONS

International Search Report (ISR), 3 pages, from KIPO (ISA/KR), dated Jan. 22, 2016 for counterpart parent PCT patent application No. PCTUS2015027399.
(Continued)

*Primary Examiner* — Mustak Choudhury
(74) *Attorney, Agent, or Firm* — J. Michael Johnson

(57) ABSTRACT

Dual light guide, grating-based backlighting redirects light guided in a first light guide in a first direction into a second light guide in a second direction of a grating-based backlight. A dual light guide, grating-based backlight includes the first light guide, the second light guide and a redirection coupler configured to redirect the guided light beam from the first light guide into the second light guide in the second direction. The dual light guide, grating-based backlight further includes a diffraction grating configured to diffractively couple out a portion of the redirected light beam from the second light guide as a coupled-out light beam directed away from a surface of the second light guide at a predetermined principal angular direction.

24 Claims, 4 Drawing Sheets

(52) U.S. Cl.
CPC .......... *G02B 6/0036* (2013.01); *G02B 6/0038* (2013.01); *G02B 6/002* (2013.01); *G02B 6/0016* (2013.01); *G02B 6/0045* (2013.01)

(58) Field of Classification Search
CPC .... G02B 6/0031; G02B 6/0038; G02B 6/002; G02B 6/0021; G02B 6/0045; G02B 6/0016; G02B 6/0018; G02B 6/12007; G02B 6/1228; G02B 2006/12107; G02B 2006/12119; G02B 5/1814
USPC ........ 359/566, 571, 569, 573; 362/331, 608, 362/296.01, 311.03, 661, 600, 609, 617; 385/14, 24, 31, 37, 47
See application file for complete search history.

(56) References Cited

U.S. PATENT DOCUMENTS

| | | | |
|---|---|---|---|
| 5,721,598 | A | 2/1998 | Smith |
| 5,729,311 | A | 3/1998 | Broer et al. |
| 5,926,294 | A | 7/1999 | Sato et al. |
| 6,271,970 | B1 | 8/2001 | Wade |
| 6,324,330 | B1 | 11/2001 | Stites |
| 6,580,529 | B1 | 6/2003 | Amitai et al. |
| 6,667,819 | B2 | 12/2003 | Nishikawa et al. |
| 6,980,271 | B2 | 12/2005 | Fujishiro |
| 7,114,820 | B1 | 10/2006 | Parikka et al. |
| 7,413,334 | B2 | 8/2008 | Baba |
| 7,742,120 | B2 | 6/2010 | Bayley et al. |
| 7,773,849 | B2 | 8/2010 | Shani |
| 7,903,332 | B2 | 3/2011 | De Zwart et al. |
| 8,026,997 | B2 | 9/2011 | Feng |
| 8,251,563 | B2 | 8/2012 | Papakonstanitinou et al. |
| 8,619,363 | B1 | 12/2013 | Coleman |
| 8,681,423 | B1 | 3/2014 | Gibson et al. |
| 8,903,207 | B1* | 12/2014 | Brown ............... G02B 27/0103 359/1 |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 2002/0008834 | A1 | 1/2002 | Suzuki |
| 2002/0075445 | A1 | 6/2002 | Dabrowski et al. |
| 2003/0086649 | A1 | 5/2003 | Zhou |
| 2004/0130879 | A1 | 7/2004 | Choi et al. |
| 2004/0156182 | A1 | 8/2004 | Hatjasalo et al. |
| 2004/0156589 | A1 | 8/2004 | Gunn et al. |
| 2005/0007753 | A1 | 1/2005 | Van Hees et al. |
| 2005/0007757 | A1 | 1/2005 | Leu et al. |
| 2005/0041174 | A1 | 2/2005 | Numata et al. |
| 2005/0073627 | A1 | 4/2005 | Akiyama |
| 2005/0123229 | A1 | 6/2005 | Huck et al. |
| 2005/0140832 | A1 | 6/2005 | Goldman et al. |
| 2005/0201122 | A1 | 9/2005 | Shinohara et al. |
| 2005/0264717 | A1 | 12/2005 | Chien et al. |
| 2006/0008347 | A1 | 4/2006 | Winkler |
| 2006/0104570 | A1 | 5/2006 | Rausch |
| 2006/0262564 | A1* | 11/2006 | Baba .................... G02B 6/0021 362/616 |
| 2007/0058394 | A1 | 3/2007 | Yu |
| 2007/0129864 | A1 | 6/2007 | Tanaka et al. |
| 2007/0201234 | A1 | 8/2007 | Ottermann |
| 2007/0213955 | A1 | 9/2007 | Ishida et al. |
| 2007/0279367 | A1 | 12/2007 | Kitai |
| 2007/0298533 | A1 | 12/2007 | Yang et al. |
| 2008/0192173 | A1 | 8/2008 | Itoh et al. |
| 2008/0204663 | A1 | 8/2008 | Balogh |
| 2008/0204873 | A1 | 8/2008 | Daniell |
| 2008/0225393 | A1 | 9/2008 | Rinko |
| 2008/0285307 | A1 | 11/2008 | Aylward et al. |
| 2008/0297696 | A1 | 12/2008 | Banerjee |
| 2008/0304535 | A1 | 12/2008 | Parriaux et al. |
| 2009/0091837 | A1 | 4/2009 | Chao et al. |
| 2009/0129116 | A1 | 5/2009 | Kim et al. |
| 2009/0207342 | A1 | 8/2009 | Yamaguchi et al. |
| 2009/0213300 | A1 | 8/2009 | Daiku |
| 2009/0244706 | A1 | 10/2009 | Levola et al. |
| 2009/0290837 | A1 | 11/2009 | Chen et al. |
| 2009/0322986 | A1 | 12/2009 | Wei et al. |
| 2010/0039832 | A1 | 2/2010 | Ahlgren et al. |
| 2010/0103485 | A1 | 4/2010 | Haussler |
| 2010/0118117 | A1 | 5/2010 | Kroll et al. |
| 2010/0123952 | A1 | 5/2010 | Chen et al. |
| 2010/0207964 | A1 | 8/2010 | Kimmel et al. |
| 2010/0277803 | A1 | 11/2010 | Pockett et al. |
| 2010/0284085 | A1 | 11/2010 | Laakkonen |
| 2010/0289870 | A1 | 11/2010 | Leister |
| 2010/0302803 | A1 | 12/2010 | Bita et al. |
| 2010/0321781 | A1 | 12/2010 | Levola et al. |
| 2011/0002143 | A1 | 1/2011 | Saarikko et al. |
| 2011/0013417 | A1 | 1/2011 | Saccomanno et al. |
| 2011/0141395 | A1 | 6/2011 | Yashiro |
| 2011/0149596 | A1 | 6/2011 | Lv et al. |
| 2011/0157257 | A1 | 6/2011 | Bennett et al. |
| 2011/0157667 | A1 | 6/2011 | Lacoste et al. |
| 2011/0182570 | A1 | 7/2011 | Yeh |
| 2011/0241573 | A1 | 10/2011 | Tsai et al. |
| 2011/0242837 | A1 | 10/2011 | Cornelissen et al. |
| 2011/0254916 | A1 | 10/2011 | Fan et al. |
| 2011/0304784 | A1 | 12/2011 | Hirota et al. |
| 2012/0008067 | A1 | 1/2012 | Mun et al. |
| 2012/0013962 | A1 | 1/2012 | Subbaraman et al. |
| 2012/0075698 | A1 | 3/2012 | Minami |
| 2012/0113678 | A1 | 5/2012 | Cornelissen et al. |
| 2012/0120213 | A1 | 5/2012 | Ohyama et al. |
| 2012/0127547 | A1 | 5/2012 | Gocho et al. |
| 2012/0127573 | A1 | 5/2012 | Robinson et al. |
| 2012/0127751 | A1 | 5/2012 | Kimmel |
| 2012/0176665 | A1 | 7/2012 | Song et al. |
| 2012/0249934 | A1 | 10/2012 | Li et al. |
| 2012/0250141 | A1 | 10/2012 | Chen |
| 2013/0057539 | A1 | 3/2013 | Kim |
| 2013/0082980 | A1 | 4/2013 | Gruhlke et al. |
| 2013/0201723 | A1 | 8/2013 | Gourlay |
| 2013/0322111 | A1 | 12/2013 | Nishitani et al. |
| 2015/0355403 | A1 | 12/2015 | Santori et al. |
| 2016/0018582 | A1 | 1/2016 | Fiorentino et al. |
| 2017/0090096 | A1 | 3/2017 | Fattal |
| 2017/0363794 | A1 | 12/2017 | Wan et al. |

FOREIGN PATENT DOCUMENTS

| | | |
|---|---|---|
| CN | 101750664 A | 6/2010 |
| CN | 202126538 | 1/2012 |
| JP | H08190095 A | 7/1996 |
| JP | 11-184387 A | 7/1999 |
| JP | 2000267041 A | 9/2000 |
| JP | 2002031788 A | 1/2002 |
| JP | 2004077897 A | 3/2004 |
| JP | 2004158336 A | 6/2004 |
| JP | 2004302186 A | 10/2004 |
| JP | 2008083532 A | 4/2008 |
| JP | 2008164963 A | 7/2008 |
| JP | 2009053499 A | 3/2009 |
| JP | 2009288718 A | 12/2009 |
| JP | 2010102188 A | 5/2010 |
| JP | 2010237416 A | 10/2010 |
| JP | 2011029161 A | 2/2011 |
| JP | 2011133677 A | 7/2011 |
| JP | 2011232717 A | 11/2011 |
| JP | 2012022085 A | 2/2012 |
| WO | 9908257 A1 | 2/1999 |
| WO | 2012069071 A1 | 5/2012 |
| WO | 2015028992 A1 | 3/2015 |

OTHER PUBLICATIONS

Travis et al., "Collimated light from a waveguide for a display backlight," Optics Express, Oct. 2009, pp. 19714-19719, vol. 17, No. 22.

(56) References Cited

OTHER PUBLICATIONS

Xu et al., "Computer-Generated Holography for Dynamic Display of 3D Objects with Full Parallax," International Journal of Virtual Reality, 2009, pp. 33-38, vol. 8, No. 2.
Fattal, David et al., "A multi-directional backlight for a wide-angle, glasses-free three-dimensional display," Nature, Mar. 21, 2013, pp. 348-351, vol. 495, Macmillan Publishers Limited, 2013.
Son, Jung-Young et al., "Three-Dimensional Imaging Methods Based on Multiview Images," IEEE/OSA Journal of Display Technology, Sep. 2005, pp. 125-140, vol. 1, No. 1.
Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.
Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.
Luxeon DCC for LCD Backlighting, Application Brief AB27, dated Jan. 2005, 38 pages.

\* cited by examiner

US 10,788,619 B2

DUAL LIGHT GUIDE GRATING-BASED BACKLIGHT AND ELECTRONIC DISPLAY USING SAME

CROSS-REFERENCE TO RELATED APPLICATIONS

This application is a continuation application of and claims the benefit of priority to prior International Application No. PCT/US2015/027399, filed Apr. 23, 2015, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light-emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
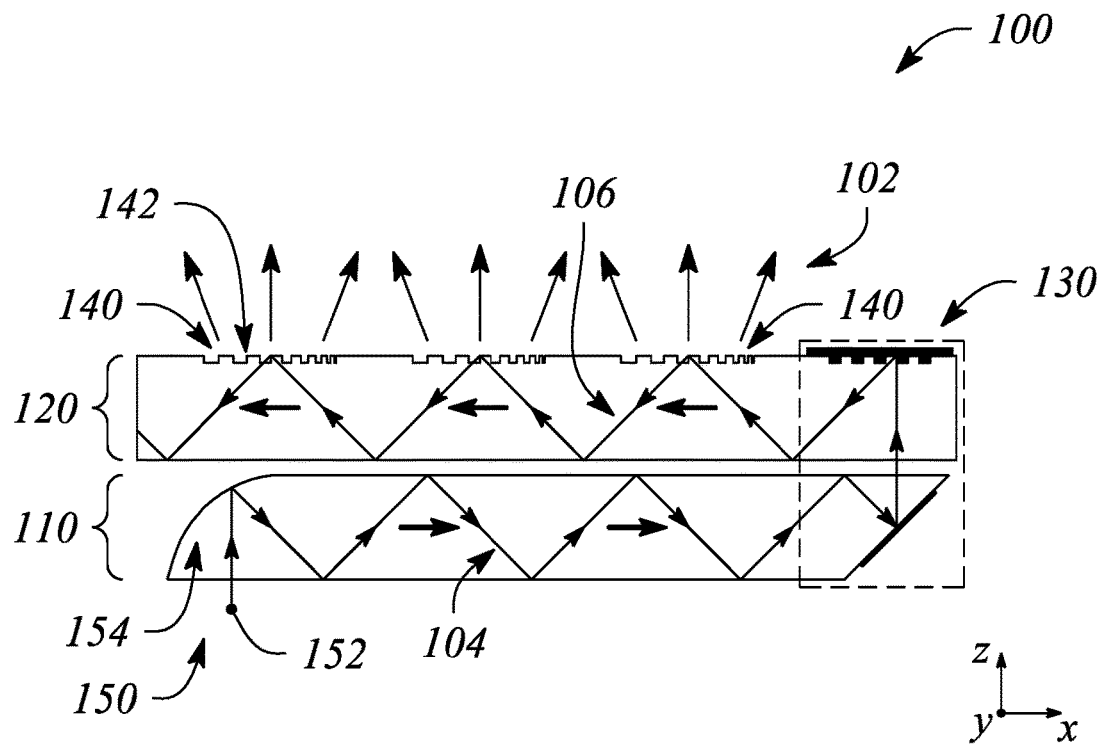
FIG. 1A illustrates a cross sectional view of a dual light guide, grating-based backlight in an example, according to an embodiment consistent with the principles described herein.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide grating-based backlighting employing dual light guides. In particular, backlighting described herein employs a first light guide to propagate a beam of light in a first direction and a second light guide to propagate a redirected light beam in a second direction. A redirection coupler is configured to redirect the light beam of the first light guide to produce the redirected light beam in the second light guide. Further, a plurality of diffraction gratings is employed to diffractively scatter or couple light out of the second light guide and to direct the coupled-out light in a direction away from the diffraction grating (e.g., in a viewing direction of an electronic display). Further, according to some embodiments, a light beam propagating in the first light guide may spread into adjacent light beams in a predetermined manner. The spreading may reduce or substantially eliminate 'striping' that may occur (e.g., due to a lack of uniformity in a collimation of the light beams) without the spreading, for example. Reduced striping may provide more uniform or consistent illumination of the diffraction gratings and, in turn, improved evenness in the coupled-out light produced by diffractive scattering, according to various embodiments.

According to various embodiments, the coupled-out light produced by the diffraction gratings forms a plurality of light beams that is directed in a predefined direction such as an electronic display viewing direction. Light beams of the plurality may have different principal angular directions from one another, according to various embodiments of the principles described herein. In particular, the plurality of light beams may form or provide a light field in the viewing direction. Further, the light beams may represent a plurality of primary colors, in some embodiments. The light beams having the different principal angular directions (also referred to as 'the differently directed light beams') and, in some embodiments, representing different colors may be employed to display information including three-dimensional (3D) information. For example, the differently directed, different color light beams may be modulated and serve as color pixels of a 'glasses free' 3D color electronic display.

Herein, a 'light guide' is defined as a structure that guides light within the structure using total internal reflection. In particular, the light guide may include a core that is substantially transparent at an operational wavelength of the light guide. In various embodiments, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense, according to some embodiments. That is, within any differentially small section of the plate light guide, the top and bottom surfaces are substantially parallel or co-planar.

In other embodiments, the plate light guide may be have a wedge shape in which a space between the top and bottom surfaces changes as a function of distance across the plate light guide. In particular, in some embodiments, the wedge shape may comprise a top surface to bottom surface spacing that increases with distance from an input end (e.g., adjacent to a light source) to an output or terminal end of the wedge-shaped plate light guide. Such a wedge-shaped light guide may provide collimation (e.g., vertical collimation) of light introduced at the input end, for example.

In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

According to various embodiments described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some embodiments, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

According to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent 'pixels' of the 3D electronic display. Moreover, as described above, the differently directed light beams may form a light field.

Herein a 'collimating' mirror is defined as a mirror having a curved shape that is configured to collimate light reflected by the collimating mirror. For example, the collimating mirror may have a reflecting surface characterized by a parabolic curve or shape. In another example, the collimating mirror may comprise a shaped parabolic mirror. By 'shaped parabolic' it is meant that a curved reflecting surface of the shaped parabolic mirror deviates from a 'true' parabolic curve in a manner determined to achieve a predetermined reflection characteristics (e.g., degree of collimation). In some embodiments, the collimating mirror may be a continuous mirror (i.e., having a substantially smooth, continuous reflecting surface), while in other embodiments the mirror may comprise a Fresnel reflector or Fresnel mirror that provides light collimation. According to various embodiments, an amount of collimation provided by the collimating mirror may vary in a predetermined degree or amount of collimation from one embodiment to another. Further, the collimating mirror may be configured to provide collimation in one or both of two orthogonal directions (e.g., a vertical direction and a horizontal direction). That is, the collimating mirror may include a parabolic or shaped parabolic shape in one or both of two orthogonal directions, according to various examples.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 1B:
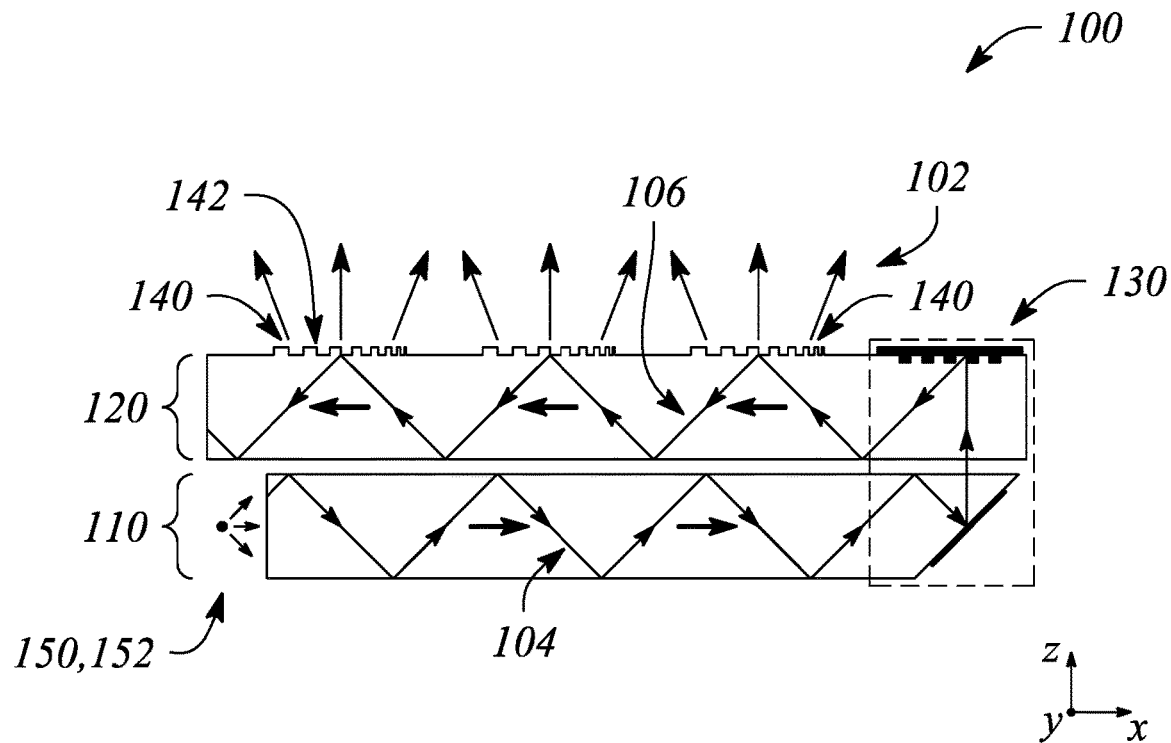
FIG. 1B illustrates a cross sectional view of a dual light guide, grating-based backlight in an example, according to another embodiment consistent with the principles described herein.

In accordance with some embodiments of the principles described herein, a dual light guide, grating-based backlight is provided. FIG. 1A illustrates a cross sectional view of a dual light guide, grating-based backlight 100 in an example, according to an embodiment consistent with the principles described herein. FIG. 1B illustrates a cross sectional view of a dual light guide, grating-based backlight 100 in an example, according to another embodiment consistent with the principles described herein. As illustrated, the dual light guide, grating-based backlight 100 is configured to produce a plurality of light beams 102. The plurality of light beams 102 may correspond to information contained in pixels of an electronic display that employs the dual light guide, grating-based backlight 100, according to various examples and embodiments.

In particular, according to some embodiments, the plurality of light beams 102 may form a light field in a viewing direction of an electronic display that employs the dual light guide, grating-based backlight 100. A light beam 102 of the plurality of light beams 102 (and within the light field) provided by the dual light guide, grating-based backlight 100 may be configured to have a different principal angular direction from other light beams 102 of the plurality. Further, the light beam 102 may have both a predetermined direction (principal angular direction) and a relatively narrow angular spread within the light field. With respect to use in a three-dimensional (3D) electronic display, the principal angular direction of the light beam 102 may correspond to an angular direction of a particular view of the 3D electronic display. As such, the light beam 102 may represent or correspond to a pixel of the 3D electronic display, according to some examples.

In other embodiments, light beams 102 of the plurality may have substantially similar predetermined principal angular directions (not illustrated in FIGS. 1A-1B). The similarly directed light beams 102 generally do not form a light field, but instead represent light emitted by the dual light guide, grating-based backlight 100 that is substantially unidirectional (e.g., perpendicular to a surface of the dual light guide, grating-based backlight 100). The similarly directed light beams 102 may be used as a backlight for a two-dimensional (2D) electronic display, for example.

In some embodiments, the light beams 102 of the plurality produced by the dual light guide, grating-based backlight 100 may be modulated (e.g., by a light valve as described below). The modulation of the light beams 102 directed in different angular directions away from the dual light guide, grating-based backlight 100 may be particularly useful for dynamic 3D color electronic display applications, for example. That is, the individually modulated light beams 102 of different colors and directed in a particular view direction may represent dynamic color pixels of the 3D electronic display corresponding to the particular view direction. Likewise, dynamic 2D electronic display applications may be supported when the light beams 102 are substantially unidirectional.

As illustrated in FIGS. 1A-1B, the dual light guide, grating-based backlight 100 comprises a first plate light guide 110. The first plate light guide 110 is configured to guide light (e.g., from a light source described below) as a guided light beam 104. In particular, the guided light beam 104 is guided in a first direction (e.g., to the right as illustrated in FIGS. 1A and 1B). Further, the first plate light guide 110 is configured to guide the guided light beam 104 at a non-zero propagation angle, according to various embodiments. For example, the first plate light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light beam 104 according to one or more guided modes of the light guide 110, for example.

As defined herein, the non-zero propagation angle is an angle relative to a surface (e.g., a top surface or a bottom surface) of the plate light guide 110. In some examples, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, the light to be guided as the guided light beam 104 is introduced or coupled into the first plate light guide 110 at the non-zero propagation angle (e.g., about 30-35 degrees). For example, one or more of a lens (not illustrated), a mirror or similar reflector (e.g., a tilted collimating reflector), and a prism (not illustrated) may facilitate coupling light into an input end the first plate light guide 110 as the beam of light at the non-zero propagation angle. Once coupled into the first plate light guide 110, the guided light beam 104 propagates along the first plate light guide 110 in the first direction that is generally away from the input end (e.g., illustrated by bold arrows pointing along an x-axis in FIGS. 1A-1B). Further, the guided light beam 104 propagates by reflecting or 'bouncing' between the top surface and the bottom surface of the plate light guide 110 at the non-zero propagation angle (e.g., illustrated by an extended, angled arrow representing a light ray of the guided light beam 104).

The guided light beam 104 produced by coupling light into the plate light guide 110 may be collimated (e.g., may be a collimated light beam), according to some examples. Further, according to some examples, the guided light beam 104 may be collimated in a plane that is perpendicular to a plane of a surface of the first plate light guide 110. For example, the first plate light guide 110 may be oriented in a horizontal plane having a top and bottom surface parallel to an x-y plane (e.g., as illustrated). The guided light beam 104 may be collimated or substantially collimated in a vertical plane (e.g., an x-z plane), for example. In another example, the first plate light guide 110 may be a wedge-shaped plate light guide 110. One of the top or bottom surface may be parallel to the x-y plane when the first plate light guide 110 is wedge-shaped, for example. In some embodiments, the guided light beam 104 may also be collimated or substantially collimated in a horizontal direction (e.g., in the x-y plane).

Herein, a 'collimated' light beam is defined as a beam of light in which rays of the light beam are substantially parallel to one another within the light beam (e.g., the guided light beam 104). Further, rays of light that diverge or are scattered from the collimated light beam are not considered to be part of the collimated light beam, by definition herein. Collimation of the light to produce the collimated guided light beam 104 may be provided by the lens or mirror (e.g., tilted collimating reflector, etc.) used to couple the light into the first plate light guide 110, according to various embodiments.

In some embodiments, the first plate light guide 110 is a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the first plate light guide 110 may comprise any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the first plate light guide 110 may further include a cladding layer on at least a portion of a surface (e.g., one or both of the top surface and the bottom surface) of the first plate light guide 110 (not illustrated). The cladding layer may be used to further facilitate total internal reflection, according to some examples.

According to various embodiments, the dual light guide, grating-based backlight 100 illustrated in FIGS. 1A-1B further comprises a second plate light guide 120. The second light guide 120 is configured to receive and guide a redirected light beam 106 in a second direction (e.g., to the left as illustrated). In some embodiments, the second direction may be substantially opposite to the first direction.

For example, as illustrated in FIGS. 1A-1B, the first plate light guide 110 and the second plate light guide 120 may be substantially parallel or co-planar to one another (e.g., stacked one on top of the other, as illustrated). The first direction may be in a positive x-direction, while the second direction may be in a negative x-direction, as illustrated in FIGS. 1A-1B, by way of example and not limitation. In other examples (not illustrated), the second direction may be substantially perpendicular or at another angle relative to the first direction. For example, when the first and second plate light guides 110, 120 are substantially co-planar, the first direction may be in the x-direction and the second direction may be in a y-direction (not illustrated). In yet other examples, the first direction may be a z-direction and the second direction may be in an x-y plane. In other words, the second direction may be substantially any direction other than the first direction, according to various embodiments.

According to various embodiments, the second plate light guide 120 may be substantially similar to the first plate light guide 110. In particular, the second plate light guide 120 may be a slab or plate optical waveguide comprising an extended, substantially planar sheet of optically transparent, dielectric material configured to guide the redirected light beam 106 using total internal reflection, as is described above with respect to the first plate light guide 110. Further, according to some examples, the second plate light guide 120 may further include a cladding layer on at least a portion of a surface (e.g., one or both of the top surface and the bottom surface) of the second plate light guide 120 (not illustrated) to further facilitate total internal reflection, also as described above.

As illustrated in FIGS. 1A and 1B, the dual light guide, grating-based backlight 100 further comprises a redirection coupler 130, according to various embodiments. The redirection coupler 130 is configured to redirect the guided light beam 104 of the first plate light guide 110 in a second direction as the redirected light beam 106. The redirected light beam 106 is then received and guided by the second plate light guide 120, according to various embodiments. In other words, the redirection coupler 130 substantially 'turns' the guided light beam 104 in a new or different direction the redirected light beam 106. As described above, the second direction of the redirected light beam 106 is different from the first direction and may be substantially opposite to the first direction of the guided light beam 104, as illustrated in FIG. 1A-1B by way of example. According to some embodiments, the redirection coupler 130 may preserve or substantially preserve collimation of the guided light beam 104 within the redirected light beam 106.

Figure 2A:
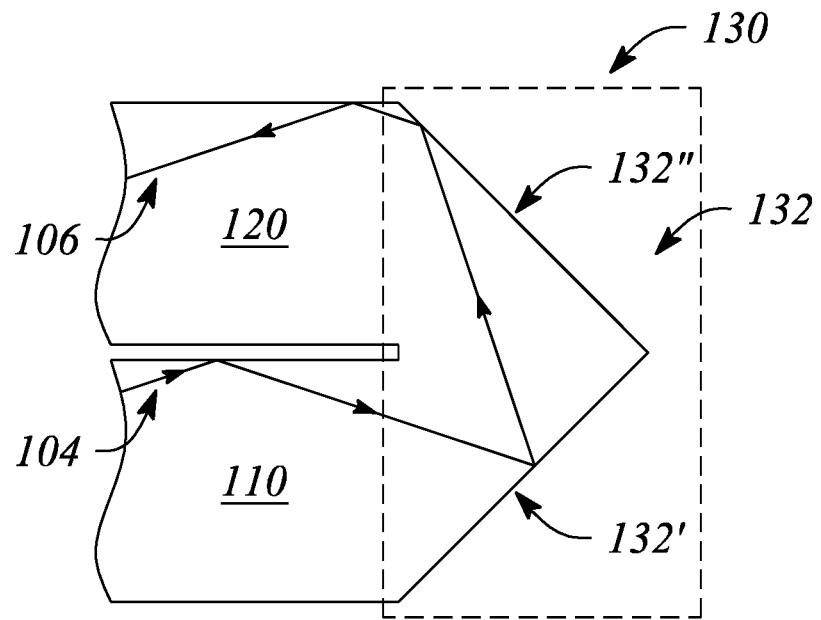
FIG. 2A illustrates a cross sectional view of a redirection coupler in an example, according to an embodiment consistent with the principles described herein.

FIG. 2A illustrates a cross sectional view of a redirection coupler 130 in an example, according to an embodiment consistent with the principles described herein. In particular, the redirection coupler 130 illustrated in FIG. 2A is a corner reflector located at an output end of the first plate light guide 110 and at an input end of the second plate light guide 120. The corner reflector of the redirection coupler 130 may include a pair of mirrors 132 or equivalent reflectors (e.g., total internal reflection or 'TIR' mirror, a Bragg mirror, etc.) arranged at an angle to one another. A first mirror 132' of the corner reflector mirror pair 132 is positioned to reflect the guided light beam 104 from the first plate light guide 110 to a second mirror 132" of the corner reflector mirror pair 132. The second mirror 132" is positioned to further reflect the reflected light beam into the second plate light guide 120. In particular, the position of the second mirror 132" relative to the first mirror 132' is configured to reflect light at an angle different from the angle of reflection by the first mirror 132'. As such, reflection at the second mirror 132" then provides the redirected light beam 106 (i.e., redirects the reflected light beam), which enters and is guided by the second plate light guide 120 in the second direction. Further, the combined reflections at the first and second mirrors 132', 132" are configured to provide the redirected light beam 106 with a predetermined, non-zero propagation angle within the second plate light guide 120. A relationship between the non-zero propagation angle of the guided light beam 104 in the first plate light guide 110 and the predetermined, non-zero propagation angle of the redirected light beam 106 guided within the second plate light guide 120 is determined by both a relative orientation of the first and second mirrors 132', 132" to one another and an orientation of the corner reflector relative to the first and second plate light guides 110, 120, according to various embodiments.

For example, as illustrated in FIG. 2A, the pair of mirrors 132 of the corner reflector may be oriented at a ninety (90) degree angle to one another. As such, the corner reflector is a retroreflector (i.e., a 90-degree corner reflector). In addition, the corner reflector of the redirection coupler 130 may be tilted relative to a plane of one or both of the first plate light guide 110 and the second plate light guide 120. The tilt of the corner reflector (or of the redirection coupler 130) is configured to provide the predetermined, non-zero propagation angle of the redirected light beam 106. For example, for the redirection coupler 130 comprising the retroreflector or 90-degree corner reflector, a tilt of zero degrees produces a redirected light beam 106 having a predetermined, non-zero propagation angle that is equal to the non-zero propagation angle of the guided light beam 104, e.g., as illustrated in FIG. 2A.

There are other angular relationships between the pair of mirrors 132 of the corner reflector of the redirection coupler 130 other than 90 degrees that may be employed. In these other angular relationships, the predetermined, non-zero propagation angle of the redirected light beam 106 may still be provided by an appropriate adjustment of an angular relationship between the corner reflector mirror pair 132 and the first and second plate light guides 110, 120, for example. In particular, the predetermined, non-zero propagation angle of the redirected light beam 106 may be readily determined for the various angular relationships between the mirrors 132', 132" themselves and between the pair of mirrors 132 and the plate light guides 110, 120 for a given the non-zero propagation angle of the guided light beam 104 using geometric optics.

Figure 2B:
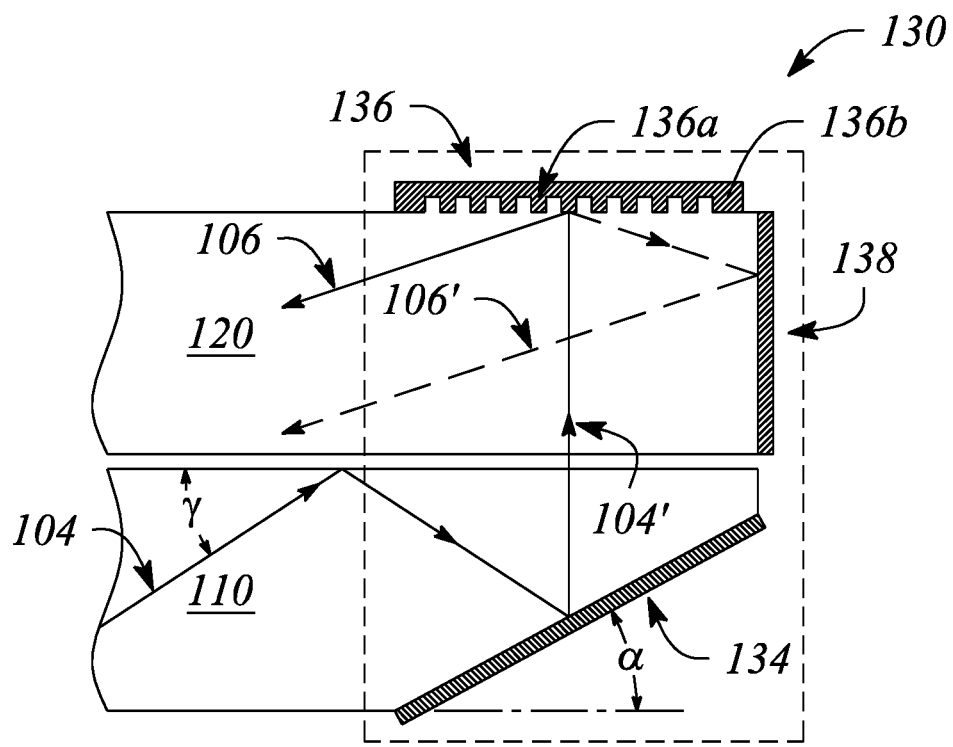
FIG. 2B illustrates a cross sectional view of a redirection coupler in an example, according to another embodiment consistent with the principles described herein.

FIG. 2B illustrates a cross sectional view of a redirection coupler 130 in an example, according to another embodiment consistent with the principles described herein. As illustrated in FIG. 2B, the redirection coupler 130 comprises a tilted mirror 134 and a grating coupler 136. By 'tilted' it is meant that the mirror 134 has a tilt angle relative to a plane of or surface of the first plate light guide 110, according to various embodiments. The tilted mirror 134 is configured to reflect the guided light beam 104 from the first plate light guide 110 toward the grating coupler 136 as a reflected light beam 104'. Note that the tilt angle of the tilted mirror 134 not only directs the reflected light beam 104' at the grating coupler 136, but also determines an angle of incidence of the reflected light beam 104' at the grating coupler 136.

The grating coupler 136 comprises a diffraction grating configured to diffract the reflected light beam 104' received from the tilted mirror 134. In particular, the grating coupler 136 diffracts the reflected light beam 104' into the second direction as the redirected light beam 106 to be guided in the second plate light guide 120, according to various embodiments. Further, a combination of the reflection by the tilted mirror 134 and the diffraction of the grating coupler 136 may provide the predetermined, non-zero propagation angle of the redirected light beam 106 within the second plate light guide 120.

For example, when the angle of incidence of the reflected light beam 104' on the grating coupler 136 is about ninety (90) degrees (or is a normal angle of incidence) as provided by the tilt angle of the tilted mirror 134, the diffraction by the grating coupler 136 is configured to determine the predetermined, non-zero propagation angle of the redirected light beam 106. In some embodiments, a tilt angle α of the tilted mirror 134 configured to provide normal incidence of the reflected light beam 104' at the grating coupler 136 may be determined according equation (1) as $$\alpha = 45° - \frac{\gamma}{2} \quad (1)$$

where γ is the non-zero propagation angle of the guided light beam 104, both of the non-zero propagation angle γ and the tilt angle α being angles from a plane of the first plate light guide 110.

In some embodiments (e.g., as illustrated in FIG. 2B), the redirection coupler 130 further comprises a second mirror 138. The second mirror 138 is configured to reflect and redirect light of a secondary diffraction product of the grating coupler 136. In particular, the second mirror 138 is oriented to reflect and redirect the secondary diffraction product light into the second direction to augment the redirected light beam 106 within the second plate light guide 120. For example, the redirected light beam 106 may correspond to light of a primary diffraction product (e.g., a positive, first order diffraction product). As illustrated, a solid line is used to denote light of the primary diffraction product (i.e., light beam 106) and a dashed line between the grating coupler 136 and the second mirror 138 denotes light of the secondary diffraction product.

The second mirror 138 may be oriented to reflect and redirect the secondary diffraction product (e.g., a negative, first order diffraction product) in the second direction and at a non-zero propagation angle that is about equal to the predetermined, non-zero propagation angle of the redirected light beam 106 within the second plate light guide 120. As such, a beam of light 106' (dashed-line 106' in FIG. 2B) corresponding to the reflected and redirected secondary diffraction product will effectively add to or augment the redirected light beam 106 resulting in an improved efficiency of the redirection coupler 130 compared to embodiments without the second mirror 138, according to some embodiments.

In particular and as mentioned above, in some embodiments (e.g., as illustrated) the tilted mirror 134 is configured reflect the guided light beam 104 of the first plate light guide 110 toward the grating coupler 136 to provide a substantially normal angle of incidence of the reflected light beam 104' at the grating coupler 136. The primary diffraction product of the diffraction grating of the grating coupler 136 may be the positive first order diffraction product, a diffraction angle of which corresponds to the predetermined, non-zero propagation angle of the redirected light beam 106. Further, the second mirror 138 may be oriented at a ninety (90) degree angle to the grating coupler 136, as illustrated in FIG. 2B. The secondary diffraction product may be a negative, first order diffraction product that has a 90-degree relationship to the primary diffraction product (i.e., the positive, first order diffraction product). The 90-degree oriented second mirror 138 is configured to reflect and redirect the secondary diffraction product as the light beam 106' in the second plate light guide 120 at substantially the same non-zero propagation angle as that of the redirected light beam 106. As such, the redirected light beam 106 is substantially augmented with the light beam 106' in the second plate light guide 120.

According to various embodiments, the tilted mirror 134 may be virtually any mirror or equivalent reflector that reflects or substantially reflects the guided light beam 104 and further that is tilted at an angle configured to change a direction of the guided light beam 104. For example, the tilted mirror 134 may comprise a metal or metalized surface (e.g., a silvered mirror). In another example, the tilted mirror 134 may be a Bragg mirror. In yet other embodiments, the tilted mirror 134 be realized by total internal reflection (TIR) and be a TIR mirror. For example, the tilted mirror 134 may be provided by a beveled surface of the first plate light guide 110 and TIR within the first plate light guide 110 in the vicinity of the beveled surface may serve as the tilted mirror 134. Moreover, the second mirror 138 may be substantially any mirror or equivalent reflector including, but not limited to, a metal or metalized surface, a Bragg mirror and a TIR mirror. For example, the second mirror 138 may be provided by metalizing an end of the second plate light guide 120. In another example, the end of the second plate light guide 120 is configured to provide TIR of the secondary diffraction product incident on the second plate light guide end as the second mirror 138.

According to some embodiments, one or more of the mirrors described above may be a collimating mirror. For example, one or both of the corner reflector mirrors 132', 132" may have a parabolic curved surface that provides collimation of the redirected light beam 106 (e.g., in a horizontal direction, a vertical direction or both). Similarly, one or both of the tilted mirror 134 and the second mirror 138 may be a collimating mirror having a parabolic curved surface to collimate the reflected light beam 104' resulting in collimation (e.g., one or both of vertical and horizontal collimation) of the redirected light beam 106 (e.g., after diffraction by the grating coupler 136).

According to various embodiments, the grating coupler 136 comprises diffractive features (e.g., grooves or ridges) spaced apart from one another to form a diffraction grating. In some embodiments, the diffractive features may be either at, in or adjacent to a surface of the second plate light guide 120. For example, the grating coupler 136 may comprise a plurality of grooves formed in a top surface of the second plate light guide 120 within the redirection coupler 130. According to various embodiments, the diffraction grating comprises uniform or substantially uniform spacing between the diffractive features. Further, a zero order diffraction product of the diffraction grating may be suppressed, according to various embodiments. For example, the diffraction grating may have a diffractive feature height or depth (e.g., ridge height or groove depth) and a duty cycle selectively chosen to suppress the zero order diffraction product. In some embodiments, the duty cycle may be between about thirty percent (30%) and about seventy percent (70%). Further, in some embodiments, the height or depth may range from greater than zero to about five hundred nanometers. For example, the duty cycle may be about fifty (50) percent and the diffractive feature height or depth may be about one hundred forty (140) nanometers.

In some embodiments, the grating coupler 136 comprises a reflective diffraction grating such as, but not limited to, a reflective metal or metalized diffraction grating. FIG. 2B illustrates the grating coupler 136 comprising diffractive features 136a as ridges on (or protruding from) the top surface of the second plate light guide 120. Further, spaces between and above the diffractive features 136a are filled by a layer 136b of a reflective material, such as a reflective metal. The reflective metal may include, but is not limited to, aluminum, nickel, silver or gold. Using a reflective diffraction grating may provide a higher diffraction efficiency compared to a dielectric diffraction grating (i.e., grooves or ridges in a dielectric material of the second plate light guide 120, for example).

Referring again to FIGS. 1A and 1B, the dual light guide, grating-based backlight 100 further comprises a diffraction grating 140. In particular, the dual light guide, grating-based backlight 100 may comprise a plurality of diffraction gratings 140, according to some embodiments. The plurality of diffraction gratings 140 may be arranged as or represent an array of diffraction gratings 140, for example. As illustrated in FIGS. 1A-1B, the diffraction gratings 140 are located at a surface of the second plate light guide 120 (e.g., a top or front surface). In other examples (not illustrated), one or more of the diffraction gratings 140 may be located within the second plate light guide 120. In yet other embodiments (not illustrated), one or more of the diffraction gratings 140 may be located at or on a bottom or back surface of the second plate light guide 120.

The diffraction grating 140 is configured to scatter or couple out a portion of the redirected light beam 106 from the second plate light guide 120 by or using diffractive coupling (e.g., also referred to as 'diffractive scattering'), according to various embodiments. The portion of the redirected light beam 106 may be diffractively coupled out by the diffraction grating 140 through the light guide surface (e.g., through the top or front surface of the second plate light guide 120). Further, the diffraction grating 140 is configured to diffractively couple out the portion of the redirected light beam 106 as a coupled-out light beam (e.g., a light beam 102).

The coupled-out light beam 102 is directed away from the light guide surface at a predetermined principal angular direction, according to various examples. In particular, the coupled-out portion of the redirected light beam 106 is diffractively redirected away from the light guide surface by the plurality of diffraction gratings 140 as the plurality of light beams 102. As discussed above, each of the light beams 102 of the light beam plurality may have a different principal angular direction and the light beam plurality may represent a light field, according to some examples. According to other examples, each of the light beams 102 of the light beam plurality may have substantially the same principal angular direction and the light beam plurality may represent substantially unidirectional light as opposed to the light field represented by the light beam plurality having light beams with different principal angular directions.

According to various embodiments, the diffraction grating 140 comprises a plurality of diffractive features 142 that diffract light (i.e., provide diffraction). The diffraction is responsible for the diffractive coupling of the portion of the redirected light beam 106 out of the second plate light guide 120. For example, the diffraction grating 140 may include one or both of grooves in a surface of the second plate light guide 120 and ridges protruding from the second light guide surface that serve as the diffractive features 142. The grooves and ridges may be arranged parallel or substantially parallel to one another and, at least at some point, perpendicular to a propagation direction of the redirected light beam 106 that is to be coupled out by the diffraction grating 140.

In some examples, the diffractive features may be etched, milled or molded into the surface or applied on the surface. As such, a material of the diffraction grating 140 may include a material of the second plate light guide 120. As illustrated in FIG. 1A, for example, the diffraction gratings 140 comprise substantially parallel grooves formed in the surface of the second plate light guide 120. In FIG. 1B, the diffraction gratings 140 comprise substantially parallel ridges that protrude from the second light guide surface, for example. In other examples (not illustrated), the diffraction gratings 140 may be implemented in or as a film or layer applied or affixed to the surface of the second light guide 120.

The plurality of diffraction gratings 140 may be arranged in a variety of configurations with respect to the second plate light guide 120. For example, the plurality of diffraction gratings 140 may be arranged in columns and rows across the light guide surface (e.g., as an array). In another example, a plurality of diffraction gratings 140 may be arranged in groups and the groups may be arranged in rows and columns. In yet another example, the plurality of diffraction gratings 140 may be distributed substantially randomly across the surface of the second plate light guide 120.

According to some embodiments, the plurality of diffraction gratings 140 comprises a multibeam diffraction grating 140. For example, all or substantially all of the diffraction gratings 140 of the plurality may be multibeam diffraction gratings 140 (i.e., a plurality of multibeam diffraction gratings 140). The multibeam diffraction grating 140 is a diffraction grating 140 that is configured to couple out the portion of the redirected light beam 106 as a plurality of light beams 102 (e.g., as illustrated in FIGS. 1A and 1B), having different principal angular directions that forms a light field, according to various embodiments.

According to various examples, the multibeam diffraction grating 140 may comprise a chirped diffraction grating 140 (i.e., a chirped multibeam diffraction grating). By definition, the 'chirped' diffraction grating 140 is a diffraction grating exhibiting or having a diffraction spacing of the diffractive features that varies across an extent or length of the chirped diffraction grating 140. Further herein, the varying diffraction spacing is defined as a 'chirp'. As a result, the redirected light beam 106 that is diffractively coupled out of the second plate light guide 120 exits or is emitted from the chirped diffraction grating 140 as the light beams 102 at different diffraction angles corresponding to different points of origin across the chirped diffraction grating 140. By virtue of a predefined chirp, the chirped diffraction grating 140 is responsible for respective predetermined and different principal angular directions of the coupled-out light beams 102 of the light beam plurality.

Figure 3A:
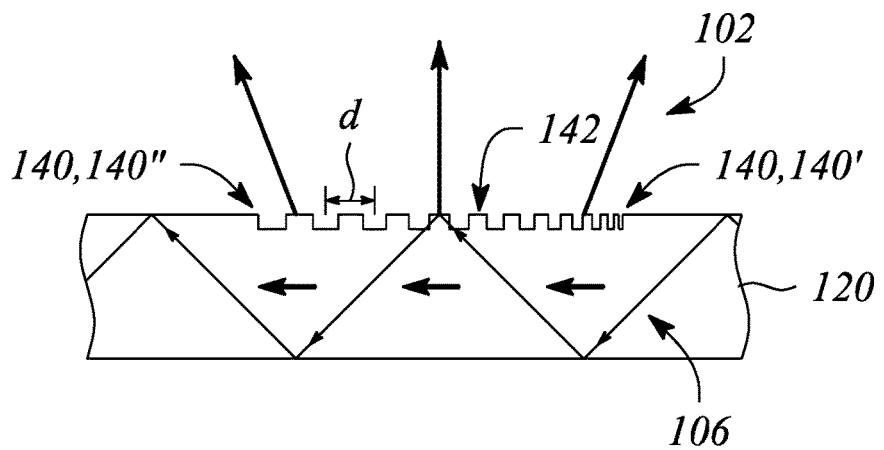
FIG. 3A illustrates a cross sectional view of a portion of a dual light guide, grating-based backlight 100 including a multibeam diffraction grating in an example, according to an embodiment consistent with the principles described herein.
Figure 3B:
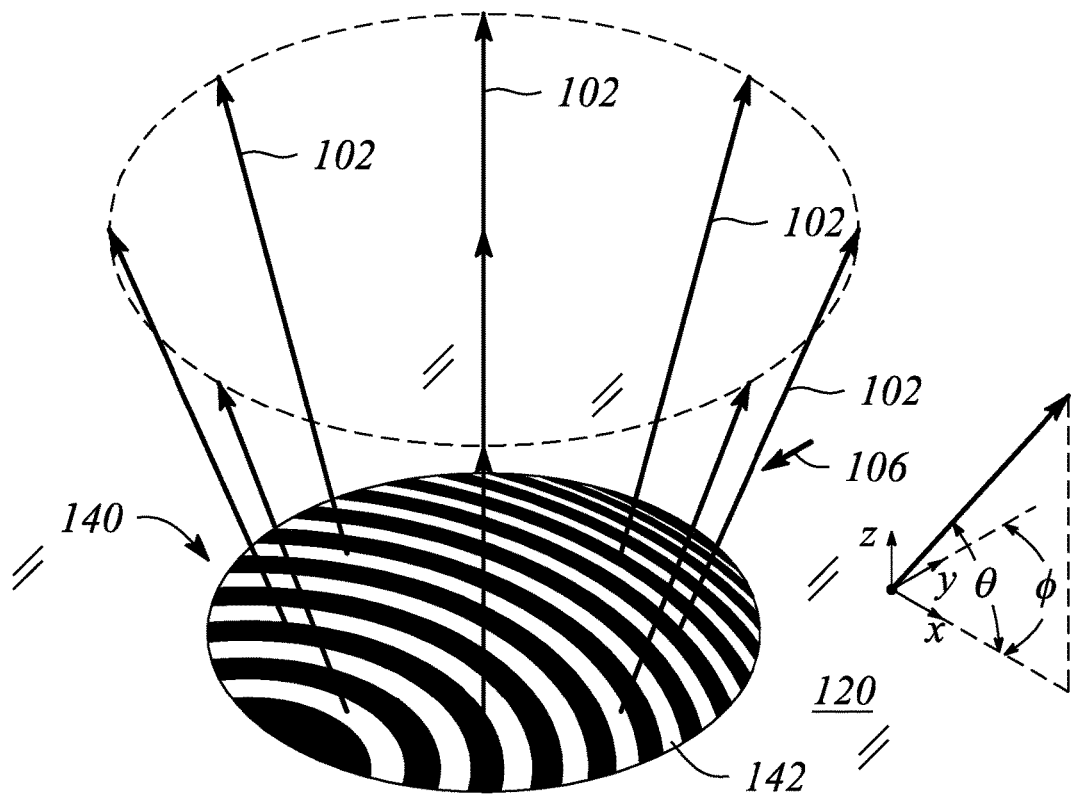
FIG. 3B illustrates a perspective view of the dual light guide, grating-based backlight portion of FIG. 3A including the multibeam diffraction grating in an example, according to an embodiment consistent with the principles described herein.

FIG. 3A illustrates a cross sectional view of a portion of a dual light guide, grating-based backlight 100 including a multibeam diffraction grating 140 in an example, according to an embodiment consistent with the principles described herein. FIG. 3B illustrates a perspective view of the dual light guide, grating-based backlight portion of FIG. 3A including the multibeam diffraction grating 140 in an example, according to an embodiment consistent with the principles described herein. The multibeam diffraction grating 140 illustrated in FIG. 3A comprises grooves in a surface of the second plate light guide 120, by way of example and not limitation. For example, the multibeam diffraction grating 140 illustrated in FIG. 3A may represent one of the groove-based diffraction gratings 140 illustrated in FIG. 1A.

As illustrated in FIGS. 3A-3B (and also FIGS. 1A-1B by way of example and not limitation), the multibeam diffraction grating 140 is a chirped diffraction grating. In particular, as illustrated, the diffractive features 142 are closer together at a first end 140' of the multibeam diffraction grating 140 than at a second end 140". Further, the diffractive spacing d of the illustrated diffractive features 142 varies linearly from the first end 140' to the second end 140". In some examples, the chirped diffraction grating 140 may have or exhibit a chirp of the diffractive spacing d that varies linearly with distance. As such, the chirped diffraction grating 140 may be referred to as a 'linearly chirped' diffraction grating.

In some embodiments, the light beams 102 produced by coupling light out of the second plate light guide 120 using the multibeam diffraction grating 140 may diverge (i.e., be diverging light beams 102) when the redirected light beam 106 propagates in the second plate light guide 120 in a direction from the first end 140' of the multibeam diffraction grating 140 to the second end 140" of the multibeam diffraction grating 140 (e.g., as illustrated in FIG. 3A). Alternatively, converging light beams 102 may be produced when the redirected light beam 106 propagates in the reverse direction in the second plate light guide 120, i.e., from the second end 140" to the first end 140' of the multibeam diffraction grating 140, according to other examples (not illustrated).

In another example (not illustrated), the chirped diffraction grating 140 may exhibit a non-linear chirp of the diffractive spacing d. Various non-linear chirps that may be used to realize the chirped diffraction grating 140 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be used.

As illustrated in FIG. 3B, the multibeam diffraction grating 140 includes diffractive features 142 (e.g., grooves or ridges) in, at or on a surface of the second plate light guide 120 that are both chirped and curved (i.e., the multibeam diffraction grating 140 is a curved, chirped diffraction grating). The redirected light beam 106 has an incident direction relative to the multibeam diffraction grating 140 and the second plate light guide 120, as illustrated by a bold arrow labeled '106' in FIGS. 3A-3B. Also illustrated is the plurality of coupled-out or emitted light beams 102 pointing away from the multibeam diffraction grating 140 at the surface of the second plate light guide 120. The illustrated light beams 102 are emitted in a plurality of predetermined different principal angular directions. In particular, the predetermined different principal angular directions of the emitted light beams 102 are different in both azimuth and elevation (e.g., to form a light field), as illustrated. According to various examples, both the predefined chirp of the diffractive features 142 and the curve of the diffractive features 142 may be responsible for a respective plurality of predetermined different principal angular directions of the emitted light beams 102.

For example, due to the curve, the diffractive features 142 within the multibeam diffraction grating 140 may have varying orientations relative to an incident direction of the redirected light beam 106 guided in the second plate light guide 120. In particular, an orientation of the diffractive features 142 at a first point or location within the multibeam diffraction grating 140 may differ from an orientation of the diffractive features 142 at another point or location relative to the guided light beam incident direction. With respect to the coupled-out or emitted light beam 102, an azimuthal component ϕ of the principal angular direction {θ, ϕ} of the light beam 102 may be determined by or correspond to the azimuthal orientation angle $\phi_f$ of the diffractive features 142 at a point of origin of the light beam 102 (i.e., at a point where the incident redirected light beam 106 is coupled out), according to some examples. As such, the varying orientations of the diffractive features 142 within the multibeam diffraction grating 140 produce different light beams 102 having different principle angular directions {θ, ϕ}, at least in terms of their respective azimuthal components ϕ.

In particular, at different points along the curve of the diffractive features 142, an 'underlying diffraction grating' of the multibeam diffraction grating 140 associated with the curved diffractive features 142 has different azimuthal orientation angles $\phi_f$. By 'underlying diffraction grating', it is meant that a diffraction grating of a plurality of non-curved diffraction gratings that in superposition yield the curved diffractive features of the multibeam diffraction grating 140. Thus, at a given point along the curved diffractive features 142, the curve has a particular azimuthal orientation angle $\phi_f$ that generally differs from the azimuthal orientation angle $\phi_f$ at another point along the curved diffractive features 142. Further, the particular azimuthal orientation angle $\phi_f$ results in a corresponding azimuthal component of a principal angular direction {θ, ϕ} of a light beam 102 emitted from the given point. In some examples, the curve of the diffractive features 142 (e.g., grooves, ridges, etc.) may represent a section of a circle. The circle may be coplanar with the light guide surface. In other examples, the curve may represent a section of an ellipse or another curved shape, e.g., that is coplanar with the light guide surface.

In other examples, the multibeam diffraction grating 140 may include diffractive features 142 that are 'piecewise' curved. In particular, while the diffractive feature 142 may not describe a substantially smooth or continuous curve per se, at different points along the diffractive feature 142 within the multibeam diffraction grating 140, the diffractive feature 142 still may be oriented at different angles with respect to the incident direction of the redirected light beam 106. For example, the diffractive feature 142 may be a groove including a plurality of substantially straight segments, each segment having a different orientation than an adjacent segment. Together, the different angles of the segments may approximate a curve (e.g., a segment of a circle), according to various embodiments. In yet other examples, the diffractive features 142 may merely have different orientations relative to the incident direction of the guided light at different locations within the multibeam diffraction grating 140 without approximating a particular curve (e.g., a circle or an ellipse).

Referring again to FIGS. 1A-1B, the dual light guide, grating-based backlight 100 further comprises a light source 150, according to some embodiments. The light source 150 may be coupled to an input end of the first plate light guide 110 opposite to the output end adjacent to the redirection coupler 130, for example. In some embodiments, the light source 150 includes a plurality of optical emitters 152. The optical emitters 152 are (or more generally the light source 150 is) configured to provide light to the first plate light guide 110 as the guided light 104, i.e., as the guided light beam 104. According to some embodiments, the provided light comprises a plurality of different colors of light that, when coupled into the plate light guide 110, is configured to be guided as a plurality of different color light beams 104, according to various embodiments. For example, the plurality of optical emitters 152 is configured to produce the plurality of different colors of light.

According to some embodiments, the guided light beams 104 of different colors are configured to be guided within the first plate light guide 110 at different, color-specific, non-zero propagation angles. For example, a red guided light beam 104 may be coupled into and propagates within the first plate light guide 110 at a first non-zero propagation angle; a green guided light beam 104 may be coupled into and propagates within the first plate light guide 110 at a second non-zero propagation angle; and a blue guided light beam 104 may be coupled into and propagates within the first plate light guide 110 at a third non-zero propagation angle. Moreover, the respective first, second and third non-zero propagation angles are different from one another.

As illustrated in FIG. 1A by way of illustration and not limitation, the light source 150 may further comprise a tilted, shaped parabolic reflector 154. The different, color specific, non-zero propagation angles may be provided by respective red, green and blue optical emitters 152 of the optical emitter plurality laterally offset from one another (not separately illustrated in FIG. 1A) that feed or emit into the tilted, shaped parabolic reflector 154 at the input end of the first plate light guide 110, for example. In particular, the lateral offset of the different color emitters 152 in conjunction with the titled, shaped parabolic reflector 154 is configured to couple the different light colors (e.g., red light, green light, and blue light) into the first plate light guide 110 at corresponding different, color-specific, non-zero propagation angles, according to various embodiments.

In some of these embodiments, the redirection coupler 130 may preserve or substantially preserve the color-specific, non-zero propagation angles when redirecting the different color guided light beams 104 into the second plate light guide 120 as redirected light beams 106 corresponding to the different colors. In particular, color-specific angular differences between the different color guided light beams 104 may be substantially preserved upon redirection. For example, the redirection coupler 130 implemented as a retroreflector may preserve the color-specific, non-zero propagation angles of the different color guided light beams 104 in the corresponding different color redirected light beams 106. Alternatively, the redirection coupler 130 may adjust, augment or otherwise change one or more of the color specific, propagation angles and still maintain a difference therebetween upon redirection into the second plate light guide 120, according to other embodiments.

According to other embodiments, the guided light beams 104 of different colors are configured to propagate within the first plate light guide 110 at similar or even about the same non-zero propagation angle. According to these embodiments, the redirection coupler 130 may be configured to provide different, color-specific, non-zero propagation angles to the redirected light beams 106 of different colors. For example, the light source 150 may be configured to produce and introduce each of a red light, a green light and a blue light into first plate light guide 110 at substantially the same non-zero propagation angle (e.g., as opposed to different, color-specific, non-zero propagation angles). In this example, the redirection coupler 130 may comprise a grating coupler configured to redirect the guided light beams of red, green and blue colors in the second direction in the second plate light guide 120 at respective different, color-specific, non-zero propagation angles. The grating coupler may be substantially similar to the grating coupler 136 described above, for example. The redirection coupler 130 may further comprise a tilted mirror to reflect guided light beams of red, green and blue colors into the tilted mirror, as described above, for example.

In various embodiments, the light source 150 may comprise substantially any source of light including, but not limited to, a light-emitting diode (LED) and a laser. In some embodiments, the light source 150 may produce a substantially monochromatic light having a narrowband spectrum denoted by a particular color. In particular, the color may be or represent a primary color (e.g., of an electronic display). For example, the light source 150 may produce a plurality of different colors of light representing a plurality of different primary colors. The primary colors may comprise red light, green light and blue light, for example. Further, the primary colors may be primary colors of a color electronic display, wherein the primary colors are selected according to a color model such as, but not limited to, a red-green-blue (RGB) color model configured to support a color gamut of the color electronic display.

According to some embodiments, the light source 150 may be a multicolor light source comprising a plurality of LEDs. LEDs of the plurality may represent different colors of the primary colors of the color electronic display, for example. In particular, the LEDs may comprise a red LED to produce red light, a green LED to produce green light, and a blue LED to produce blue light of the RGB color model, for example. In some embodiments, the light source 150 may comprise a linear array of optical emitters 152 arranged along the input end of the first plate light guide 110. Each of the optical emitters may comprise a red LED, a green LED and blue LED, for example. The light source 150 may be configured to produce collimated light (e.g., using a collimating reflector or lens). For example, the tilted, shaped-parabolic reflector 154 illustrated in FIG. 1A may be configured to produce a collimated light beam 104 when coupling light from the optical emitters 152 into the first plate light guide 110. Substantially any collimator (e.g., collimating lens, collimating reflector, etc.) may be inserted between the light source 150 and the first plate light guide 110 in FIG. 1A to provide a collimated light beam 104, according to various embodiments.

According to some embodiments of the principles described herein, a three-dimensional (3D) electronic display is provided. The 3D electronic display is configured to emit modulated light beams having different directions as pixels of the 3D electronic display. The 3D electronic display is configured to display 3D information (e.g., 3D images). In some examples, the 3D electronic display is an autostereoscopic or glasses-free 3D electronic display. In particular, different ones of the modulated, differently directed, light beams may correspond to different 'views' associated with the 3D electronic display, according to various examples. The different views may provide a 'glasses free' (e.g., autostereoscopic, holographic, etc.) representation of information being displayed by the 3D electronic display, for example.

Figure 4:
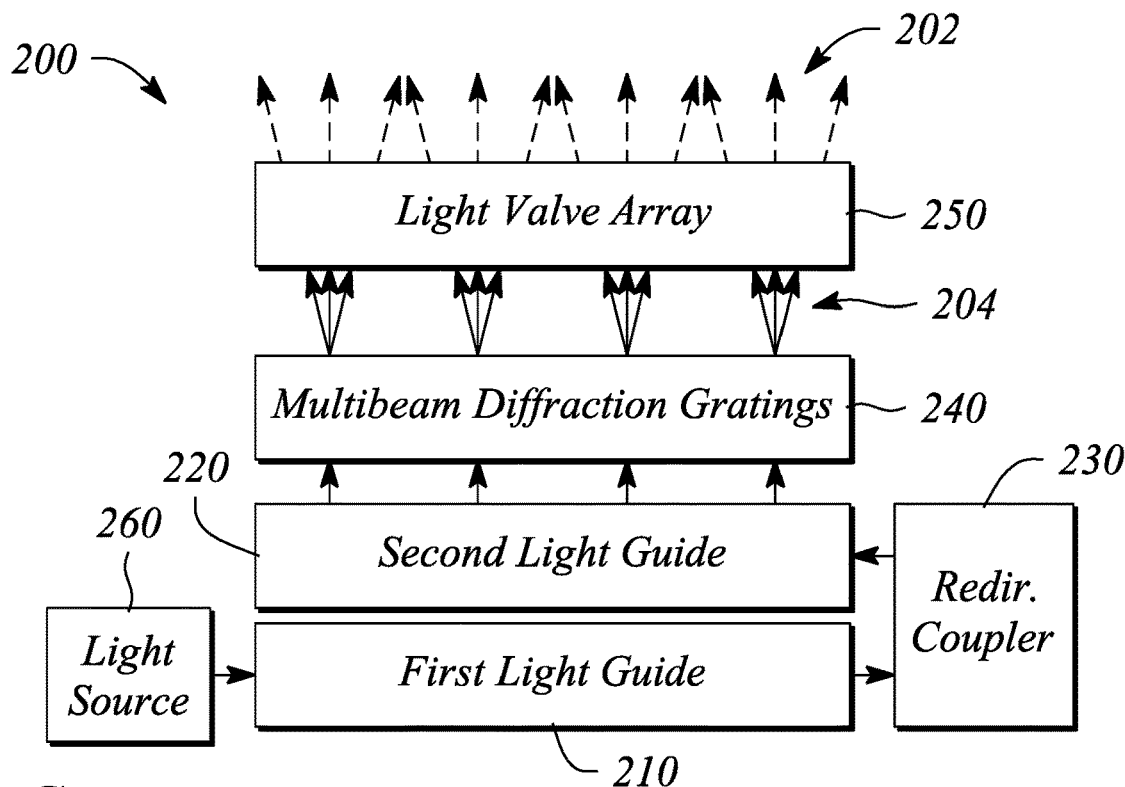
FIG. 4 illustrates a block diagram of a three-dimensional (3D) electronic display in an example, according to an embodiment consistent with the principles described herein.

FIG. 4 illustrates a block diagram of a 3D electronic display 200 in an example, according to an embodiment consistent with the principles described herein. The 3D electronic display 200 may be used to present 3D information such as, but not limited to, 3D images. In particular, the 3D electronic display 200 illustrated in FIG. 4 is configured to emit modulated light beams 202 in different principal angular directions representing pixels corresponding to the different views of the 3D electronic display 200. The modulated light beams 202 are illustrated as diverging (e.g., as opposed to converging) in FIG. 4, by way of example and not limitation. In some embodiment, the light beams 202 may further represent different colors and the 3D electronic display 200 may be a 3D color electronic display.

The 3D electronic display 200 illustrated in FIG. 4 comprises a first light guide 210 and a second light guide 220 configured to guide light. The guided light in the second light guide 220 is a source of the light that becomes the modulated light beams 202 emitted by the 3D electronic display 200. According to some embodiments, the first light guide 210 may be a plate light guide and may be substantially similar to the first plate light guide 110 described above with respect to the dual light guide, grating-based backlight 100. Further, according to some embodiments, the second light guide 220 may be a plate light guide and may be substantially similar to the second plate light guide 120 of dual light guide, grating-based backlight 100, also described above. For example, the first and second light guides 210, 220 may each be a slab optical waveguide comprising a planar sheet of dielectric material configured to guide light by total internal reflection. In some embodiments, the first light guide 210 and the second light guide 220 as plate light guides may be arranged substantially co-planar to one another (e.g., as illustrated above in FIGS. 1A-1B).

In other embodiments, one or both of the first light guide 210 and the second light guide 220 may comprise a strip light guide. For example, one or both of the first light guide 210 and the second light guide 220 may comprise a plurality of substantially parallel strip light guides arranged adjacent to one another to approximate a plate light guide and thus be considered a form of a 'plate' light guide, by definition herein. However, the adjacent strip light guides of this form of plate light guide may confine light within the respective strip light guides and substantially prevent leakage into adjacent strip light guides (i.e., unlike a substantially continuous slab of material of the 'true' plate light guide), for example.

According to various embodiments, the guided light within each of the first and second light guides 210, 220 is configured to propagate at a non-zero propagation angle as a beam of light. In some embodiments, the guided light may include a plurality of different color guided light beams. Further, a guided light beam in one or both of the first light guide 210 and the second light guide 220 may be collimated (i.e., the light may be guided as collimated or substantially collimated beams of light), according to some embodiments. For example, the first and second light guides 210, 220 may be configured to guide light as a collimated light beam at a non-zero propagation angle within the respective light guides 210, 220.

As illustrated in FIG. 4, the 3D electronic display 200 further comprises a redirection coupler 230. The redirection coupler 230 is configured to couple and redirect a guided light beam from the first light guide 210 into the second light guide 220. According to some embodiments, the redirection coupler 230 may be substantially similar to the redirection coupler 130 described above with respect to the dual light guide, grating-based backlight 100. For example, in some embodiments, the redirection coupler 230 may comprise a corner reflector (e.g., as illustrated in FIG. 2A).

In another embodiment, the redirection coupler 230 may comprise a tilted mirror and a reflective grating coupler (e.g., as illustrated in FIG. 2B). The tilted mirror and reflective grating coupler may be substantially similar to the tilted mirror 134 and grating coupler 136 of the redirection coupler 130, described above. In particular, the tilted mirror may be configured to reflect the guided light beam from the first light guide 210 toward the reflective grating coupler. In turn, the reflective grating coupler may be configured to diffract and redirect the reflected guided light beam received from the tilted mirror into the second light guide 220 as a redirected light beam to be guided within the second light guide 220.

The 3D electronic display 200 illustrated in FIG. 4 further comprises an array of multibeam diffraction gratings 240. The array of multibeam diffraction gratings 240 may be located in, on or at a surface of the second light guide 220, for example. According to various embodiments, a multibeam diffraction grating 240 of the array is configured to diffractively couple out a portion of the redirected light beam guided within the second light guide 210 as plurality of coupled-out light beams 204 having different principal angular directions representing or corresponding to different views of the 3D electronic display 200. In some embodiments, the multibeam diffraction gratings 240 may be substantially similar to the multibeam diffraction gratings 140 of the dual light guide, grating-based backlight 100, described above.

For example, the array of multibeam diffraction gratings 240 may include a chirped diffraction grating. In some embodiments, diffractive features (e.g., grooves, ridges, etc.) of the multibeam diffraction gratings 240 are curved diffractive features. For example, the curved diffractive features may include ridges or grooves that are curved (i.e., continuously curved or piece-wise curved) and spacings between the curved diffractive features that vary as a function of distance across the multibeam diffraction gratings 240 of the array. In some embodiments, the multibeam diffraction gratings 240 may be chirped diffraction gratings having curved diffractive features.

As illustrated in FIG. 4, the 3D electronic display 200 further includes a light valve array 250. The light valve array 250 includes a plurality of light valves configured to modulate the coupled-out light beams 204 of the light beam plurality. In particular, the light valves of the light valve array 250 modulate the coupled-out light beams 204 to provide the modulated light beams 202 that are or represent pixels of the 3D electronic display 200. Moreover, different ones of the modulated light beams 202 may correspond to different views of the 3D electronic display 200. In various examples, different types of light valves in the light valve array 250 may be employed including, but not limited to, one or more of liquid crystal (LC) light valves, electrowetting light valves and electrophoretic light valves. Dashed lines are used in FIG. 4 to emphasize modulation of the light beams 202, by way of example.

Further, as illustrated in FIG. 4, the 3D electronic display 200 may further comprise a light source 260, according to some embodiments. The light source 260 is optically coupled to an input end of the first light guide 210 opposite to an output end adjacent to the redirection coupler 230. In some embodiments, the light source 260 is substantially similar to the light source 150 described above with respect to the dual light guide, grating-based backlight 100. In particular, the light source 260 may comprise a plurality of optical emitters (e.g., LEDs).

For example, in some embodiments, the light source 260 may comprise the plurality of optical emitters (e.g., LEDs) arranged along the input end of the first light guide 210 to provide a corresponding plurality of guided light beams within the first light guide 210. The guided light beams of the plurality may be guided in substantially parallel bands across the first light guide 210 from the input end to the output end thereof. The optical emitters of the light source 260 may be arranged as a linear array, each optical emitter producing a different collimated guided light beam within the first light guide 210, for example. In some embodiments, an optical length of the first light guide 210 in a propagation direction of the guided light beams is greater than a distance along the first light guide 210 at which the different guided light beams of the plurality spread by about one half of a spacing between individual ones of the substantially parallel bands. In other words, the first light guide optical length is long enough so that adjacent collimated guided light beams spread into one another.

According to some embodiments, the light source 260 may be configured to produce different colors of light (i.e., is a color light source). As such, the 3D electronic display 200 may be a 3D color electronic display 200, in some embodiments. For example, the optical emitters of the plurality may comprise a first optical emitter configured to emit a first color of light (e.g., red light), a second optical emitter configured to emit a second color of light (e.g., green light), and a third optical emitter configured to emit a third color of light (e.g., blue light). The first optical emitter may be a red light-emitting diode (LED), the second optical emitter may be a green LED, and the third optical emitter may be a blue LED, for example. In other examples, the optical emitter may include each of a red LED, a green LED and a blue LED and thus be a multicolor optical emitter, for example.

In some embodiments in which the light source 260 is a color light source, the redirection coupler 230 may comprise a grating coupler configured to reflect and redirect different color light beams into the second light guide 220 at different, color-specific, non-zero propagation angles. Further, the color-specific, propagation angles may be configured to produce coupled-out color light beams 204 from the multibeam diffraction grating 240 that form color-specific light fields configured to provide color pixels corresponding to different views of the 3D electronic display 200. According to various embodiments, the color-specific light fields may have substantially similar cone angles to one another and therefore produce color-specific pixels representing substantially similar 3D electronic display views to one another, albeit in the different colors.

Figure 5:
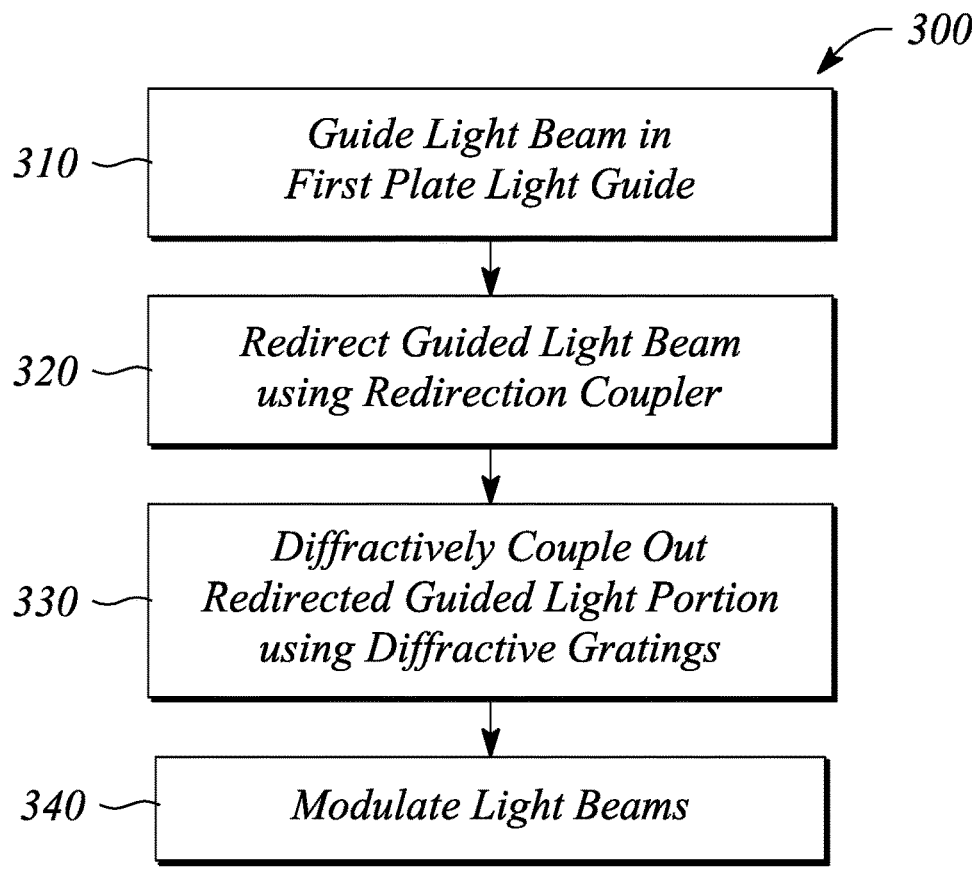
FIG. 5 illustrates a flow chart of a method of grating-based backlight operation in an example, according to an embodiment consistent with the principles described herein.

According to some examples of the principles described herein, a method of grating-based backlight operation is provided. FIG. 5 illustrates a flow chart of a method 300 of grating-based backlight operation in an example, according to an embodiment consistent with the principles described herein. As illustrated in FIG. 5, the method 300 of grating-based backlight operation comprises guiding 310 light in a first plate light guide at a non-zero propagation angle as a guided light beam. According to some embodiments, the guided light beam is collimated. In some embodiments, the first plate light guide is substantially similar to the first plate light guide 110, described above with respect to the dual light guide, grating-based backlight 100.

The method 300 of grating-based backlight operation further comprises redirecting 320 the guided light beam using a redirection coupler into a second plate light guide as a redirected guided light beam. According to some embodiments, the second plate light guide is substantially similar to the second plate light guide 120 described above with respect to the dual light guide, grating-based backlight 100. Further, according to some embodiments, redirecting 320 the guided light beam employs a redirection coupler that is substantially similar to the redirection coupler 130 of the dual light guide, grating-based backlight 100, described above. For example, the redirection coupler may comprise a corner reflector or another means to redirect 320 the guided light beam from a first direction of propagation within the first plate light guide into a second direction of propagation of the second plate light guide.

In some embodiments, redirecting 320 the guided light beam comprises reflecting the guided light beam from the first plate light guide toward a grating coupler. Reflecting the guided light beam may employ a tilted mirror that is substantially similar to the tilted mirror 134 of the redirection coupler 130, described above. Redirecting 320 the guided light beam further comprises diffractively redirecting the reflected light beam into the second plate light guide as the redirected guided light beam using the grating coupler. According to some embodiments, the grating coupler may be substantially similar to the grating coupler 136 described above with respect to the dual light guide, grating-based backlight 100. In some embodiments that employ the grating coupler, redirecting 320 the guided light beam may further include redirecting a secondary diffraction product produced by the grating coupler using a second mirror or similar reflector (e.g., a second mirror such as, but not limited to, the second mirror 138, described above).

According to some embodiments, the guided light beam may be a light beam of a plurality of different color light beams guided in the first plate light guide. In some embodiments, guiding 310 light of the different color light beams comprises guiding each different color light beam at a different, color-specific, non-zero propagation angle. Further, redirecting 320 the guided light beam where the light beam is the plurality of different color light beams comprises diffractively redirecting each different color light beam into the second plate light guide at a different, color-specific, non-zero propagation angle employing a grating coupler.

As illustrated in FIG. 5, the method 300 of grating-based backlight operation further includes diffractively coupling out 330 a portion of the redirected guided light using a diffraction grating at a surface of the second plate light guide. Diffractively coupling out 330 the redirected guided light portion is configured to produce a coupled-out light beam directed away from the second plate light guide at a predetermined principal angular direction.

According to various examples, diffraction gratings are located at, in or on the surface of the second plate light guide. The diffraction gratings may be formed in the surface thereof as grooves, ridges, etc. In other examples, the diffraction gratings may include a film on the second plate light guide surface. In some examples, the diffraction gratings are substantially similar to the diffraction grating 140 described above with respect to the dual light guide, grating-based backlight 100. In particular, the diffraction grating may be a multibeam diffraction grating configured to produce a plurality of light beams from the diffractively coupled out 330 portions of the redirected guided light beam. The multibeam diffraction grating may be substantially similar to the multibeam diffraction grating 140 described above including, but not limited to, a chirped diffraction grating comprising one of curved grooves and curved ridges that are spaced apart from one another. In other examples, the diffraction grating is located elsewhere including, but not limited to, within the second plate light guide.

According to various embodiments, the diffractively coupled out 330 portion of redirected guided light of the method 300 of grating-based backlight operation may produce a plurality of emitted (or coupled-out) light beams directed away from the surface of the second light guide. Each of the emitted light beams of the light beam plurality is directed away from the surface at a predetermined principal angular direction. In particular, when the diffraction gratings are multibeam diffraction gratings, an emitted light beam of the light beam plurality may have a different principal angular direction from other emitted light beams of the light beam plurality.

According to some embodiments, the emitted light beams of the light beam plurality may correspond to pixels of an electronic display that employs the grating-based backlight. In particular, when the multibeam diffraction grating is employed in diffractively coupling out 330 the portion of redirected guided light, the plurality of coupled-out (or emitted) light beams may be directed away from the second plate light guide in a plurality of different principal angular directions corresponding to different views of a three-dimensional (3D) electronic display. As such, the electronic display may be a 3D electronic display. In other embodiments, the electronic display may be a 2D electronic display.

In some embodiments, the method 300 of grating-based backlight operation further comprises modulating 340 the emitted light beams of the light beam plurality using a plurality of light valves. In particular, the plurality of emitted light beams that is diffractively coupled out 330 is modulated 340 by passing through or otherwise interacting with a corresponding plurality of light valves. Modulated light beams emitted from the light valve plurality may form the pixels of the electronic display that employs the grating-based backlight (including the 3D electronic display), according to some embodiments. For example, the modulated 340 light beams may provide a plurality of views of the 3D electronic display (e.g., a glasses-free, 3D electronic display).

In some examples, the plurality of light valves used in modulating 340 the plurality of emitted light beams is substantially similar to the light valve array 250 described above with respect to the 3D electronic display 200. For example, the light valves may include liquid crystal light valves. In another example, the light valves may be another type of light valve including, but not limited to, an electrowetting light valve and an electrophoretic light valve. Modulating 340 may be applied on a color-specific basis, according to some embodiments (e.g., when color optical emitters are employed).

Thus, there have been described examples of a grating-based backlight, a 3D electronic display and a method of grating-based backlight operation that employ dual light guides. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A dual light guide, grating-based backlight comprising:
a first light guide plate configured to guide a light beam in a first direction and at a non-zero propagation angle as a guided light beam;
a second light guide plate configured to receive and guide a redirected light beam in a second direction;
a redirection coupler configured to redirect the guided light beam of the first light guide plate into the second light guide plate as the redirected light beam in the second direction, wherein the redirection coupler comprises a tilted mirror and a grating coupler, the tilted mirror being configured to reflect the guided light beam received from the first light guide plate toward the grating coupler, the grating coupler being configured to diffract the reflected light beam from the tilted mirror into the second direction as the redirected light beam to be guided in the second light guide plate; and
a diffraction grating configured to diffractively couple out a portion of the redirected light beam from the second light guide plate as a coupled-out light beam directed away from a surface of the second light guide plate at predetermined principal angular direction.

2. The dual light guide, grating-based backlight of claim 1, wherein the guided light beam is collimated in a plane perpendicular to a plane of the first light guide plate.

3. The dual light guide, grating-based backlight of claim 1, wherein the light guide plate and the second light guide plate are substantially parallel to one another, and wherein the first direction of the guided light beam is substantially opposite to the second direction of the redirected light beam.

4. The dual light guide, grating-based backlight of claim 1, wherein the redirection coupler further comprises a second mirror configured to reflect and redirect light of a secondary diffraction product from the grating coupler into the second direction to augment the redirected light beam within the second light guide plate.

5. The dual light guide, grating-based backlight of claim 1, wherein the tilted mirror is configured to reflect the guided light beam from the first light guide plate toward the grating coupler to provide a substantially normal angle of incidence of the reflected light beam at the grating coupler.

6. The dual light guide, grating-based backlight of claim 1, wherein the grating coupler comprises a reflective diffraction grating.

7. The dual light guide, grating-based backlight of claim 1, wherein the diffraction grating comprises a multibeam diffraction grating configured to couple out the portion of the redirected light beam as a plurality of coupled-out light beams, a light beam of the coupled-out light beam plurality having a different principal angular direction from other light beams of the coupled-out light beam plurality.

8. The dual light guide, grating-based backlight of claim 7, wherein the multibeam diffraction grating is a linearly chirped diffraction grating.

9. The dual light guide, grating-based backlight of claim 7, wherein the plurality of coupled-out light beams having different principal angular directions form a light distribution configured to provide pixels corresponding to different views of a three dimensional (3D) electronic display.

10. The dual light guide, grating-based backlight of claim 1, further comprising a light source coupled to an input end of the first light guide plate opposite an output end adjacent to the redirection coupler, the light source to provide a plurality of different colors of light to be guided as a plurality of different color light beams.

11. The dual light guide, grating-based backlight of claim 10, wherein the different color light beams are guided within the first light guide plate at different, color-specific, non-zero propagation angles.

12. The dual light guide, grating-based backlight of claim 10, wherein the redirection coupler comprises a grating coupler configured to redirect the different color light beams in the second direction, each of the different color light beams being redirected at a different, color-specific, non-zero propagation angle into the second light guide plate by the grating coupler.

13. An electronic display comprising the dual light guide, grating-based backlight of claim 1, the electronic display further comprising a light modulator configured to modulate the coupled-out light beam, the diffraction grating being at the surface of the second light guide plate adjacent to the light modulator, wherein the modulated, coupled-out light beam corresponds to a pixel of the electronic display.

14. A three-dimensional (3D) electronic display comprising:
a first light guide and a second light guide;
a redirection coupler configured to couple and redirect a guided light beam from the first light guide into the second light guide;
an array of multibeam diffraction gratings at a surface of the second light guide, a multibeam diffraction grating of the array being configured to diffractively couple out a portion of the redirected light beam guided within the second light guide as plurality of coupled-out light beams having different principal angular directions representing different views of the 3D electronic display; and
a light modulator array configured to modulate the coupled-out light beams, the modulated coupled-out light beams representing pixels corresponding to the different views,
wherein the redirection coupler comprises a tilted mirror and a reflective grating coupler, the tilted mirror being configured to reflect the guided light beam from the first light guide toward the reflective grating coupler, the reflective grating coupler being configured to diffract the reflected guided light beam from the tilted mirror into the second light guide as a redirected guided light beam within the second light guide.

15. The 3D electronic display of claim 14, wherein one or both of the first light guide and the second light guide comprise a light guide plate, the first and second light guides being arranged substantially co-planar to one another, and wherein the first and second light guides are configured to guide light as a collimated light beam at a non-zero propagation angle.

16. The 3D electronic display of claim 14, wherein the multibeam diffraction grating is a chirped diffraction grating comprising one of curved grooves and curved ridges that are spaced apart from one another.

17. The 3D electronic display of claim 14, further comprising a light source optically coupled to an input end of the first light guide opposite an output end of the first light guide adjacent to the redirection coupler, the light source comprising a plurality of light-emitting diodes arranged along the input end of the first light guide to provide a corresponding plurality of light beams guided in substantially parallel bands by the first light guide.

18. The 3D electronic display of claim 17, wherein the light-emitting diodes of the plurality corresponding to each of the substantially parallel bands comprise a first light-emitting diode configured to emit red light, a second light-emitting diode configured to emit green light, and a third light-emitting diode configured to emit blue light, the 3D electronic display being a 3D color electronic display.

19. The 3D electronic display of claim 18, wherein the redirection coupler comprises a grating coupler configured to couple and redirect different color guided light beams into the second light guide at corresponding different, color-specific, non-zero propagation angles, the multibeam diffraction grating being configured to diffractively couple out portions of the redirected different color guided light beams at the corresponding different color-specific, propagation angles as corresponding different color-specific light distributions, the different color-specific light distributions being configured to provide color pixels corresponding to different views of the 3D electronic display, the color-specific light distributions having substantially similar cone angles to one another and producing color-specific pixels representing substantially similar 3D electronic display views to one another in the different colors.

20. A method of grating-based backlight operation employing dual light guides, the method comprising:
guiding light in a first light guide plate at a non-zero propagation angle as a guided light beam, the guided light beam being collimated;
redirecting the guided light beam using a redirection coupler into a second light guide plate as a redirected guided light beam; and
diffractively coupling out a portion of the redirected guided light beam using a diffraction grating at a surface of the second light guide plate to produce a coupled-out light beam directed away from the second light guide plate at a predetermined principal angular direction,
wherein redirecting the guided light beam comprises: reflecting the guided light beam from the first light guide plate toward a grating coupler; and diffractively redirecting the reflected light beam into the second light guide plate as the redirected guided light beam using the grating coupler.

21. The method of grating-based backlight operation of claim 20, wherein the guided light beam is a plurality of different color light beams, the different color light beams being guided in the first light guide plate at corresponding different, color-specific non-zero propagation angles, and wherein redirecting the guided light beam comprises employing a grating coupler to diffractively redirect the different color light beams into the second light guide plate at the corresponding different, color-specific, non-zero propagation angles.

22. The method of grating-based backlight operation of claim 20, wherein diffractively coupling out a portion of the redirected guided light beam comprises employing a multibeam diffraction grating to produce a plurality of coupled-out light beams that are directed away from the second light guide plate in a plurality of different principal angular directions corresponding to different views of a 3D electronic display.

23. The method of grating-based backlight operation of claim 22, wherein the multibeam diffraction grating is a linearly chirped diffraction grating comprising one of curved grooves and curved ridges that are spaced apart from one another.

24. The method of grating-based backlight operation of claim 22, further comprising modulating the plurality of coupled-out light beams using a plurality of light modulators, modulated light beams of the coupled-out light beam plurality forming pixels of the 3D electronic display corresponding to the different views.

* * * * *